US012573955B2

(12) United States Patent
Chen et al.

(10) Patent No.: US 12,573,955 B2
(45) Date of Patent: Mar. 10, 2026

(54) POWER CONVERTER HAVING CURRENT LIMIT PROTECTION MECHANISM

(71) Applicant: ANPEC ELECTRONICS CORPORATION, Hsinchu (TW)

(72) Inventors: Chih-Ning Chen, Taipei City (TW); Chih-Heng Su, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 233 days.

(21) Appl. No.: 18/633,476

(22) Filed: Apr. 11, 2024

(65) Prior Publication Data

US 2025/0192667 A1 Jun. 12, 2025

(30) Foreign Application Priority Data

Dec. 6, 2023 (TW) ................................. 112147376

(51) Int. Cl.
*H02M 3/158* (2006.01)
*H02M 1/00* (2006.01)
*H02M 1/32* (2007.01)

(52) U.S. Cl.
CPC ......... *H02M 3/158* (2013.01); *H02M 1/0009* (2021.05); *H02M 1/32* (2013.01)

(58) Field of Classification Search
CPC ....... H02M 1/32; H02M 1/0009; H02M 3/158
See application file for complete search history.

(56) References Cited

U.S. PATENT DOCUMENTS

| | | | | |
|---|---|---|---|---|
| 6,127,815 A * | 10/2000 | Wilcox | ................ | H02M 3/156 |
| | | | | 323/351 |
| 7,880,455 B2 * | 2/2011 | Wu | ........................ | H02M 1/32 |
| | | | | 323/284 |
| 8,018,694 B1 * | 9/2011 | Wu | ........................ | H02M 1/32 |
| | | | | 361/18 |
| 10,491,099 B2 * | 11/2019 | Yamaguchi | ............. | H02M 1/32 |
| 10,855,182 B2 * | 12/2020 | Hung | .................... | H02M 3/158 |
| 2006/0214647 A1 * | 9/2006 | Ishimaru | ............. | H02M 3/1588 |
| | | | | 323/222 |
| 2009/0128113 A1 * | 5/2009 | Ryoo | .................... | H02M 3/156 |
| | | | | 323/283 |
| 2011/0115456 A1 * | 5/2011 | Tanifuji | ................ | H02M 3/156 |
| | | | | 323/283 |

(Continued)

*Primary Examiner* — Yusef A Ahmed
(74) *Attorney, Agent, or Firm* — Li & Cai Intellectual Property Office

(57) ABSTRACT

A power converter having a current limit protection mechanism is provided. An error amplifier of the power converter multiples a difference between (a divided voltage of) an output voltage of the power converter and a reference voltage by a gain to output an error amplified signal. A comparator of the power converter compares the error amplified signal with a ramp signal to output an on-time signal. A current limiting circuit of the power converter detects data related to a high-side switch and a low-side switch of the power converter. The current limiting circuit of the power converter compares working periods and non-working periods of the on-time signal with blanking times to output a current limiting signal. A control circuit of the power converter, according to the current limiting signal, determines whether to control the high-side switch and the low-side switch according to the detected data.

13 Claims, 9 Drawing Sheets

(56) References Cited

U.S. PATENT DOCUMENTS

| | | | | |
|---|---|---|---|---|
| 2012/0153921 A1* | 6/2012 | Brokaw | ............... | H02M 3/156 |
| | | | | 323/288 |
| 2013/0120891 A1* | 5/2013 | Truong | ................... | H02M 1/32 |
| | | | | 361/93.9 |
| 2014/0062434 A1* | 3/2014 | Ouyang | ............... | H02M 3/156 |
| | | | | 323/284 |
| 2014/0084883 A1* | 3/2014 | Tanabe | ............... | H02M 3/1582 |
| | | | | 323/271 |
| 2014/0253061 A1* | 9/2014 | Yang | .................... | H02M 3/158 |
| | | | | 323/271 |
| 2015/0123638 A1* | 5/2015 | Thiele | .................. | H02M 3/156 |
| | | | | 323/293 |
| 2015/0280544 A1* | 10/2015 | Wang | ..................... | H02M 1/32 |
| | | | | 323/285 |
| 2016/0105111 A1* | 4/2016 | Yang | .................. | H02M 3/1563 |
| | | | | 323/271 |
| 2018/0321702 A1* | 11/2018 | Chen | ...................... | G05F 3/262 |
| 2019/0190280 A1* | 6/2019 | Chen | .................. | H02M 3/1582 |
| 2019/0245440 A1* | 8/2019 | Hallikainen | .......... | H02M 3/156 |
| 2020/0076310 A1* | 3/2020 | Takenaka | .............. | H02M 3/158 |
| 2020/0343815 A1* | 10/2020 | Nam | ....................... | H02M 1/32 |
| 2021/0159789 A1* | 5/2021 | Hsu | ....................... | H02M 3/158 |
| 2022/0239215 A1* | 7/2022 | Wachi | ................. | H02M 1/0032 |
| 2022/0271658 A1* | 8/2022 | Wu | ......................... | H02M 1/08 |
| 2022/0271666 A1* | 8/2022 | Hsu | .................... | H02M 3/1582 |
| 2023/0114513 A1* | 4/2023 | Wei | ........................ | H02M 1/08 |
| | | | | 323/271 |
| 2023/0179081 A1* | 6/2023 | Li | ..................... | H02M 3/33576 |
| | | | | 363/21.01 |
| 2023/0208299 A1* | 6/2023 | Chen | ....................... | H02M 1/08 |
| | | | | 323/271 |
| 2024/0030799 A1* | 1/2024 | Yang | .................... | H02M 3/156 |
| 2024/0072669 A1* | 2/2024 | Lan | ...................... | H02M 1/0032 |
| 2024/0120841 A1* | 4/2024 | Yang | ........................ | H02M 1/08 |
| 2024/0171075 A1* | 5/2024 | Lu | ......................... | H02M 3/158 |
| 2024/0195287 A1* | 6/2024 | Chen | ....................... | H02M 1/32 |
| 2024/0356428 A1* | 10/2024 | Hsieh | .................... | H02M 1/088 |
| 2024/0405663 A1* | 12/2024 | Hsu | ...................... | H02M 1/088 |
| 2025/0007401 A1* | 1/2025 | Wei | ...................... | H03K 17/082 |
| 2025/0015708 A1* | 1/2025 | Cremonesi | ......... | H02M 1/0022 |

* cited by examiner

POWER CONVERTER HAVING CURRENT LIMIT PROTECTION MECHANISM

CROSS-REFERENCE TO RELATED PATENT APPLICATION

This application claims the benefit of priority to Taiwan Patent Application No. 112147376, filed on Dec. 6, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a current limit protection mechanism.

BACKGROUND OF THE DISCLOSURE

Power converters are indispensable for electronic devices. The power converters are used to adjust power and supply the adjusted power to the electronic devices. A high-side switch and a low-side switch of the power converter must be switched according to voltages or currents of circuit components in the power converter such that the power converter supplies appropriate power to a load. However, a conventional controller circuit of the power converter cannot effectively control on-times and off-times of the high-side switch and the low-side switch of the power converter, which results in a low operating efficiency of the power converter.

SUMMARY OF THE DISCLOSURE

In response to the above-referenced technical inadequacies, the present disclosure provides a power converter having a current limit protection mechanism. The power converter includes a high-side switch, a low-side switch, an error amplifier, a comparator, a current limiting circuit and a control circuit. A first terminal of the high-side switch is coupled to an input voltage. A first terminal of the low-side switch is connected to a second terminal of the high-side switch. A second terminal of the low-side switch is grounded. A first terminal of the low-side switch is connected to a first terminal of an inductor. A second terminal of the inductor is connected to a first terminal of an output capacitor. A second terminal of the output capacitor is grounded. A first terminal of the output capacitor is used as a feedback node. A first input terminal of the error amplifier is coupled to a reference voltage. A second input terminal of the error amplifier is connected to the feedback node. A first input terminal of the comparator is connected to an output terminal of the error amplifier. A second input terminal of the comparator is connected to an external ramp signal generator circuit. The second input terminal of the comparator receives a ramp signal from the external ramp signal generator circuit. A current limiting circuit is connected to the first terminal of the high-side switch, the second terminal of the low-side switch and an output terminal of the comparator. The control circuit is connected to the current limiting circuit, a control terminal of the high-side switch and a control terminal of the low-side switch. The current limiting circuit detects data of the first terminal of the high-side switch to output a high-side detected signal. The current limiting circuit compares an on-time signal with a high-side blank time signal to output a high-side current limiting signal. The control circuit, according to the high-side current limiting signal, determines whether to control the high-side switch and the low-side switch according to the high-side detected signal. The current limiting circuit detects data of the second terminal of the low-side switch to output a low-side detected signal. The current limiting circuit compares the on-time signal with a low-side blank time signal to output a low-side current limiting signal. The control circuit, according to the low-side current limiting signal, determines whether to control the high-side switch and the low-side switch according to the low-side detected signal.

In one of the possible or preferred embodiments, the control circuit turns on the high-side switch within a working period of the on-time signal. The current limiting circuit compares the working period of the on-time signal from the comparator with a working period of the high-side blank time signal to output the high-side current limiting signal.

In one of the possible or preferred embodiments, the control circuit turns on the low-side switch within a non-working period of the on-time signal. The current limiting circuit compares the non-working period of the on-time signal from the comparator with a non-working period of the low-side blank time signal to output the low-side current limiting signal.

In one of the possible or preferred embodiments, the control circuit turns on the high-side switch within a working period of the on-time signal. When the current limiting circuit determines that the working period of the on-time signal is smaller than a working period of the high-side blank time signal, the current limiting circuit determines that the data of the first terminal of the high-side switch that is detected within the working period of the on-time signal is not used to control and switch the high-side switch and the low-side switch.

In one of the possible or preferred embodiments, the control circuit turns on the low-side switch within a non-working period of the on-time signal. When the current limiting circuit determines that the non-working period of the on-time signal from the comparator is smaller than a non-working period of the low-side blank time signal, the current limiting circuit determines that the data of the second terminal of the low-side switch that is detected within the non-working period of the on-time signal is not used to control and switch the high-side switch and the low-side switch.

In one of the possible or preferred embodiments, the current limiting circuit includes a high-side current limit detecting circuit, a high-side period comparing circuit, a high-side current limit instructing circuit, a low-side current limit detecting circuit, a low-side period comparing circuit and a low-side current limit instructing circuit. The high-side current limit detecting circuit is connected to the first terminal of the high-side switch. The high-side current limit detecting circuit is configured to detect the data of the first terminal of the high-side switch to output the high-side detected signal. The high-side period comparing circuit is connected to the high-side current limit detecting circuit and the output terminal of the comparator. The high-side period comparing circuit is configured to compare the on-time signal from the comparator with the high-side blank time signal from the high-side current limit detecting circuit to output a high-side period compared signal. The high-side current limit instructing circuit is connected to the high-side period comparing circuit and the control circuit. The high-side current limit instructing circuit is configured to output the high-side current limiting signal to the control circuit according to the high-side period compared signal from the high-side period compared signal. The low-side current limit detecting circuit is connected to the second terminal of the low-side switch. The low-side current limit detecting circuit is configured to detect the data of the second terminal of the low-side switch to output the low-side detected signal. The low-side period comparing circuit is connected to the low-side current limit detecting circuit and the output terminal of the comparator. The low-side period comparing circuit is configured to compare a non-working period of the on-time signal from the comparator with a non-working period of the low-side blank time signal from the low-side current limit detecting circuit to output a low-side period compared signal. The low-side current limit instructing circuit is connected to the low-side period comparing circuit and the control circuit. The low-side current limit instructing circuit is configured to the low-side current limiting signal to the control circuit according to the low-side period compared signal from the low-side period comparing circuit.

In one of the possible or preferred embodiments, the high-side current limit detecting circuit includes a high-side blank time setting circuit and a high-side detecting circuit. The high-side blank time setting circuit is connected to the high-side period comparing circuit. The high-side blank time setting circuit is configured to set and output the high-side blank time signal to the high-side period comparing circuit. The high-side detecting circuit is connected to the first terminal of the high-side switch and the high-side current limit instructing circuit. The high-side detecting circuit is configured to detect the data of the first terminal of the high-side switch to output the high-side detected signal to the high-side current limit instructing circuit. The high-side current limit instructing circuit, according to the high-side period compared signal, determines whether to transmit the high-side detected signal from the high-side detecting circuit to the control circuit.

In one of the possible or preferred embodiments, the low-side current limit detecting circuit includes a low-side blank time setting circuit and a low-side detecting circuit. The low-side blank time setting circuit is connected to the low-side period comparing circuit. The low-side blank time setting circuit is configured to set and output the low-side blank time signal to the low-side period comparing circuit. The low-side detecting circuit is connected to the second terminal of the low-side switch and the low-side current limit instructing circuit. The low-side detecting circuit is configured to detect the data of the second terminal of the low-side switch to output the low-side detected signal to the low-side current limit instructing circuit. The low-side current limit instructing circuit determines whether to transmit the low-side detected signal from the low-side detecting circuit to the control circuit according to the low-side detected signal.

In one of the possible or preferred embodiments, the low-side detecting circuit includes a high-side comparator and a first high-side AND gate. The high-side comparator is a comparator. A first input terminal of the high-side comparator is coupled to a high-side threshold voltage. A second input terminal of the high-side comparator is connected to the first terminal of the high-side switch. The first high-side AND gate is an AND gate. A first input terminal of the first high-side AND gate is connected to an output terminal of the high-side blank time setting circuit. A second input terminal of the first high-side AND gate is connected to an output terminal of the high-side comparator. An output terminal of the first high-side AND gate is connected to an input terminal of the high-side current limit instructing circuit and an input terminal of the low-side current limit instructing circuit.

In one of the possible or preferred embodiments, the low-side detecting circuit includes a low-side comparator and a first low-side AND gate. The low-side comparator is a comparator. A first input terminal of the low-side comparator is coupled to a low-side threshold voltage. A second input terminal of the low-side comparator is connected to the second terminal of the low-side switch. The first low-side AND gate is an AND gate. A first input terminal of the first low-side AND gate is connected to an output terminal of the low-side blank time setting circuit. A second input terminal of the first low-side AND gate is connected to an output terminal of the low-side comparator. An output terminal of the first low-side AND gate is connected to the input terminal of the low-side current limit instructing circuit and the input terminal of the high-side current limit instructing circuit.

In one of the possible or preferred embodiments, the high-side current limit instructing circuit includes a high-side OR gate, a high-side flip-flop and a second high-side AND gate. The high-side OR gate is an OR gate. A first input terminal of the high-side OR gate is connected to an output terminal of the high-side period comparing circuit. The first input terminal of the high-side OR gate receives a high-side period reverse compared signal from the output terminal of the high-side period comparing circuit. A second input terminal of the high-side OR gate is connected to the output terminal of the first low-side AND gate. The high-side flip-flop is a flip-flop. A first input terminal of the high-side flip-flop is connected to the output terminal of the high-side period comparing circuit. The first input terminal of the high-side flip-flop receives the high-side period compared signal from the output terminal of the high-side period comparing circuit. A second input terminal of the high-side flip-flop is connected to an output terminal of the high-side OR gate. A first input terminal of the second high-side AND gate is connected to the output terminal of the first high-side AND gate. A second input terminal of the second high-side AND gate is connected to an inverting output terminal of the high-side flip-flop. An output terminal of the second high-side AND gate is connected to an input terminal of the control circuit.

In one of the possible or preferred embodiments, the low-side current limit instructing circuit includes a low-side OR gate, a low-side OR gate and a second low-side AND gate. The low-side OR gate is an OR gate. A first input terminal of the low-side OR gate is connected to an output terminal of the low-side period comparing circuit. The first input terminal of the low-side OR gate receives a low-side period reverse compared signal from the output terminal of the low-side period comparing circuit. A second input terminal of the low-side OR gate is connected to the output terminal of the first high-side AND gate. The low-side flip-flop is a flip-flop. A first input terminal of the low-side flip-flop is connected to the output terminal of the low-side period comparing circuit. The first input terminal of the low-side flip-flop receives the low-side period compared signal from the output terminal of the low-side period comparing circuit. A second input terminal of the low-side flip-flop is connected to an output terminal of the low-side OR gate. The second low-side OR gate is an AND gate. A first input terminal of the second low-side AND gate is connected to the output terminal of the first low-side AND gate. A second input terminal of the second low-side AND gate is connected to an inverting output terminal of the low-side flip-flop. An output terminal of the second low-side AND gate is connected to the input terminal of the control circuit.

In one of the possible or preferred embodiments, the power converter further includes an input resistor and an input capacitor. A first terminal of the input resistor is connected to an output terminal of the error amplifier and the first input terminal of the comparator. A first terminal of the input capacitor is connected to a second terminal of the input resistor. A second terminal of the input capacitor is grounded.

In one of the possible or preferred embodiments, the power converter further includes a voltage divider circuit. An input terminal of the voltage divider circuit is connected to a node between the second terminal of the inductor and the first terminal of the output capacitor. An output terminal of the voltage divider circuit is connected to the second input terminal of the error amplifier.

In one of the possible or preferred embodiments, the voltage divider circuit includes a first resistor and a second resistor. A first terminal of the first resistor is connected to the node between the second terminal of the inductor and the first terminal of the output capacitor. A first terminal of the second resistor is connected to a second terminal of the first resistor. A second terminal of the second resistor is grounded. A node between the first terminal of the second resistor and the second terminal of the first resistor is connected to the second input terminal of the error amplifier.

As described above, the present disclosure provides the power converter having the current limit protection mechanism. After the high-side switch and the low-side switch are switched in the power converter of the present disclosure, the data including the voltage signal and the current signal of the power converter is detected. At this time, the current limit circuit of the power converter determines whether the data of the power converter is detected when the data fluctuates unexpectedly, and accordingly determines whether the data is used to control the high-side switch and the low-side switch. The high-side switch and the low-side switch of the power converter of the present disclosure are switched only according to the corrected data. As a result, when a load connected to the power converter of the present disclosure is a heavy load, the high-side switch and the low-side switch of the power converter of the present disclosure is capable of being accurately switched at a high frequency. Therefore, an overall operating efficiency of the power converter of the present disclosure is effectively improved. The load obtains enough power from the power converter of the present disclosure under the condition that overcurrent and overvoltage events do not occur in the power converter of the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
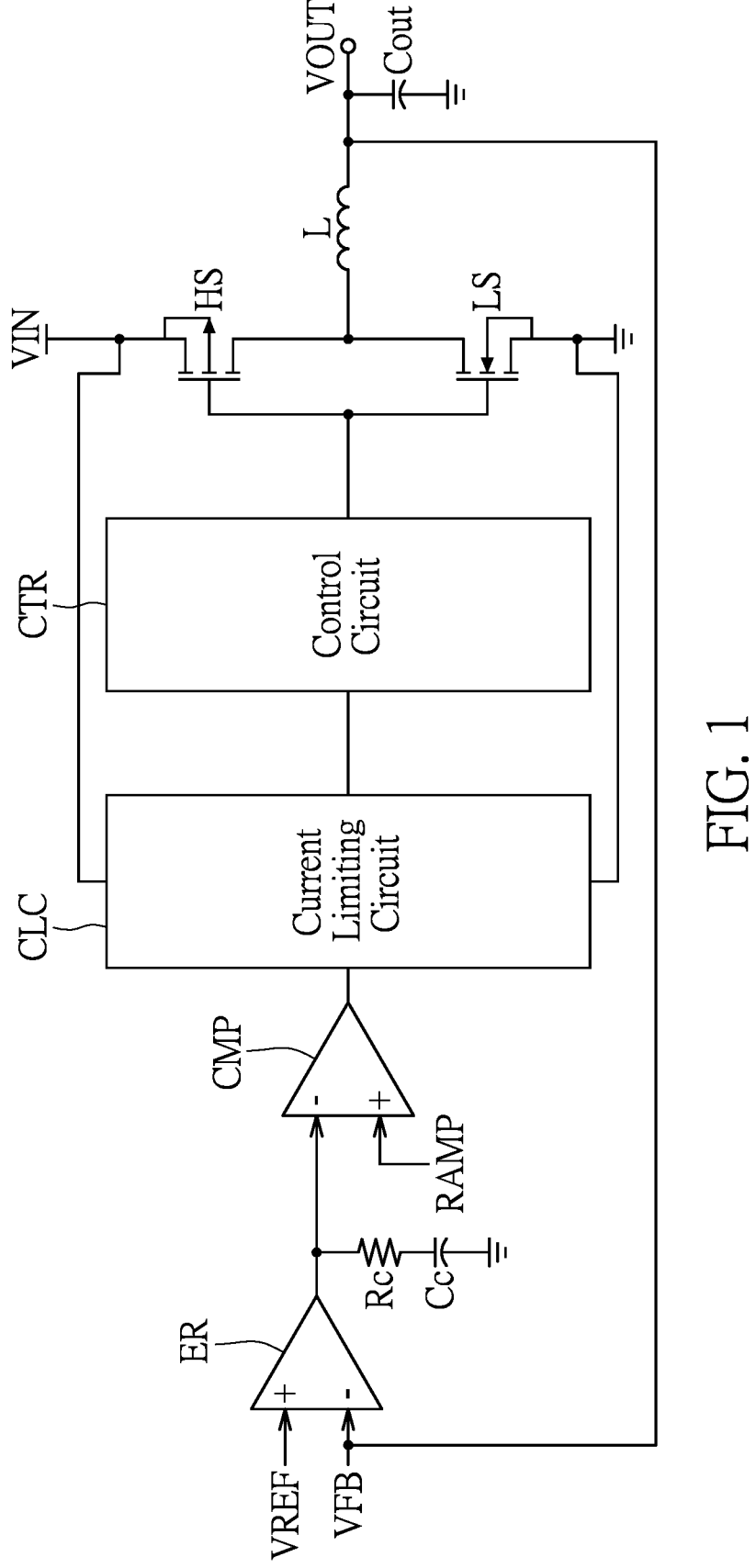
FIG. 1 is a circuit diagram of a power converter having a current limit protection mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter having a current limit protection mechanism according to a first embodiment of the present disclosure.

In the first embodiment, the power converter of the present disclosure includes a high-side switch HS, a low-side switch LS, an error amplifier ER, a comparator CMP, a current limiting circuit CLC and a control circuit CTR.

A first terminal of the high-side switch HS is coupled to an input voltage VIN. A first terminal of the low-side switch LS is connected to a second terminal of the high-side switch HS. A second terminal of the low-side switch LS is grounded. A first terminal of the low-side switch LS is connected to a first terminal of an inductor L. A second terminal of the inductor L is connected to a first terminal of an output capacitor Cout. A second terminal of the output capacitor Cout is grounded.

A first input terminal such as a non-inverting input terminal of the error amplifier ER is coupled to a reference voltage VREF. A second input terminal such as an inverting input terminal of the error amplifier ER is connected to a node between the second terminal of the inductor L and the first terminal of the output capacitor Cout. In the first embodiment, the node between the second terminal of the inductor L and the first terminal of the output capacitor Cout is used as a feedback node. The second input terminal such as the inverting input terminal of the error amplifier ER receives a feedback voltage VFB of the feedback node that is an output voltage VOUT of the power converter of the present disclosure.

A first input terminal such as an inverting input terminal of the comparator CMP is connected to an output terminal of the error amplifier ER. A second input terminal such as a non-inverting input terminal of the comparator CMP is connected to an external ramp signal generator circuit, and receives a ramp signal RAMP from the external ramp signal generator circuit.

If necessary, the power converter of the first embodiment of the present disclosure may further include an input resistor Rc and an input capacitor Cc as shown in FIG. 1. A first terminal of the input resistor Rc is connected to the output terminal of the error amplifier ER and the first input terminal such as the inverting input terminal of the comparator CMP. A first terminal of the input capacitor Cc is connected to a second terminal of the input resistor Rc. A second terminal of the input capacitor Cc is grounded.

The comparator CMP compares a voltage of an error amplified signal (or a voltage of the first terminal of the input resistor Rc) with the ramp signal RAMP from the external ramp signal generator circuit to output an on-time signal.

The current limiting circuit CLC is connected to an output terminal of the comparator CMP, the first terminal of the high-side switch HS and the second terminal of the low-side switch LS. The control circuit CTR is connected to an output terminal of the current limiting circuit CLC, a control terminal of the high-side switch HS and a control terminal of the low-side switch LS.

The current limiting circuit CLC may detect a voltage, a current or other data of the first terminal of the high-side switch HS to output a high-side detected signal.

It is worth noting that, after the high-side switch HS and the low-side switch LS are switched, a voltage signal and a current signal of the power converter fluctuate unexpectedly within a time interval. Therefore, the voltage signal and the current signal of the power converter detected within the time interval are not correct data. The time interval includes a high-side blank time signal and a low-side blank time signal as described herein. In the power converter of the present disclosure, the control circuit CTR does not control the high-side switch HS and the low-side switch LS according to the data that is detected within a working period of the high-side blank time signal and a non-working period of the low-side blank time signal.

The current limiting circuit CLC compares the on-time signal from the comparator CMP with the high-side blank time signal to output a high-side current limiting signal. The control circuit CTR, according to the high-side current limiting signal from the current limiting circuit CLC, determines whether to control and switch the high-side switch HS and the low-side switch LS according to the high-side detected signal from the current limiting circuit CLC.

The control circuit CTR may turn on the high-side switch HS and turn off the low-side switch LS within a working period of the on-time signal.

When the current limiting circuit CLC determines that the working period of the on-time signal from the comparator CMP is smaller than the working period of the high-side blank time signal, the current limiting circuit CLC determines that the data of the high-side switch HS that is detected within the working period of the on-time signal is not used to control and switch the high-side switch HS and the low-side switch LS.

The current limiting circuit CLC compares the on-time signal from the comparator CMP with the low-side blank time signal to output a low-side current limiting signal.

The control circuit CTR, according to the low-side current limiting signal from the current limiting circuit CLC, determines whether to control and switch the high-side switch HS and the low-side switch LS according to the detected voltage, current or other data of the first terminal of the low-side switch LS that are included in a low-side detected signal from the current limiting circuit CLC.

The control circuit CTR may turn on the low-side switch LS and turn off the high-side switch HS within a non-working period of the on-time signal.

When the current limiting circuit CLC determines that the non-working period of the on-time signal is smaller than the non-working period of the low-side blank time signal, the current limiting circuit CLC determines that the data of the second terminal of the low-side switch LS that is detected within the non-working period of the on-time signal is not used to control and switch the high-side switch HS and the low-side switch LS.

Figure 2:
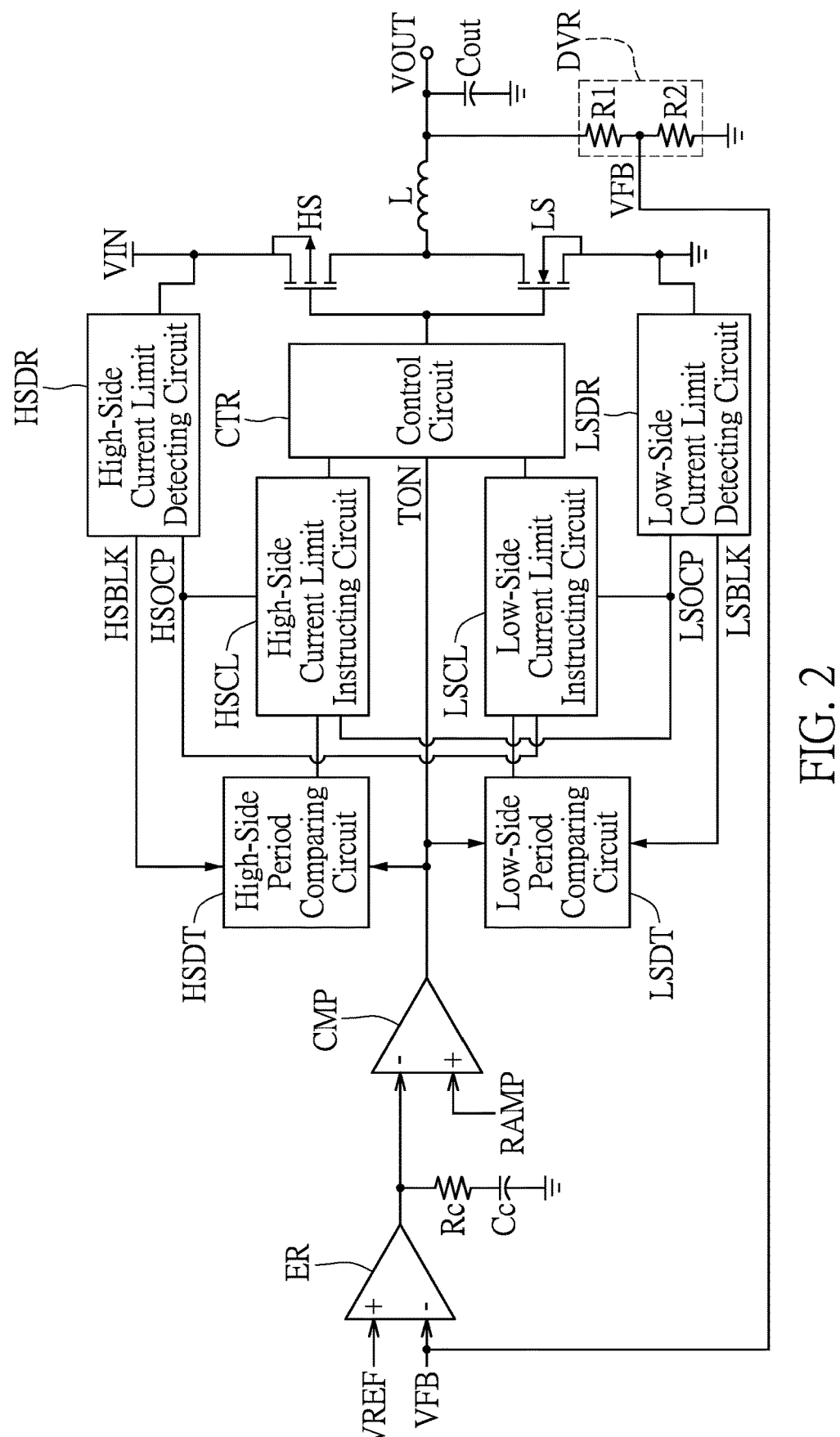
FIG. 2 is a circuit diagram of a power converter having a current limit protection mechanism according to a second embodiment of the present disclosure.

Reference is made to FIG. 2, which is a circuit diagram of a power converter having a current limit protection mechanism according to a second embodiment of the present disclosure. The descriptions of the second embodiment of the present disclosure that are the same as that of the first embodiment of the present disclosure are not repeated herein.

In the second embodiment, a current limit circuit of the power converter of the present disclosure includes a high-side current limit detecting circuit HSDR, a high-side period comparing circuit HSDT, a high-side current limit instructing circuit HSCL, a low-side current limit detecting circuit LSDR, a low-side period comparing circuit LSDT and a low-side current limit instructing circuit LSCL.

If necessary, the current limit circuit of the power converter of the present disclosure may further include a voltage divider circuit DVR. The voltage divider circuit DVR may include a first resistor R1 and a second resistor R2.

A first terminal of the first resistor R1 is connected to the node between the second terminal of the inductor L and the first terminal of the output capacitor Cout. A first terminal of the second resistor R2 is connected to a second terminal of the first resistor R1. A second terminal of the second resistor R2 is grounded. A node between the first terminal of the second resistor R2 and the second terminal of the first resistor R1 is connected to a second input terminal such as an inverting input terminal of the error amplifier ER.

The high-side period comparing circuit HSDT is connected to the first terminal of the high-side switch HS. The high-side current limit detecting circuit HSDR detects the voltage, the current or other data of the first terminal of the high-side switch HS to output a high-side detected signal HSOCP.

The high-side period comparing circuit HSDT is connected to the high-side current limit detecting circuit HSDR and the output terminal of the comparator CMP. The high-side period comparing circuit HSDT compares an on-time signal TON from the comparator CMP with a high-side blank time signal HSBLK from the high-side current limit detecting circuit HSDR to output a high-side period compared signal.

The high-side current limit instructing circuit HSCL is connected to the high-side period comparing circuit HSDT and the control circuit CTR. The high-side current limit instructing circuit HSCL outputs the high-side current limiting signal to the control circuit CTR according to the high-side period compared signal from the high-side period comparing circuit HSDT.

The low-side current limit detecting circuit LSDR is connected to the second terminal of the low-side switch LS. The low-side current limit detecting circuit LSDR detects the voltage or the current or other data of the second terminal of the low-side switch LS to output a low-side detected signal LSOCP.

The low-side period comparing circuit LSDT is connected to the low-side current limit detecting circuit LSDR and the output terminal of the comparator CMP. The low-side period comparing circuit LSDT compares the on-time signal TON from the comparator CMP with a low-side blank time signal LSBLK to output the low-side period compared signal.

The low-side current limit instructing circuit LSCL is connected to the low-side period comparing circuit LSDT and the control circuit CTR. The low-side current limit instructing circuit LSCL outputs the low-side current limiting signal to the control circuit CTR according to the low-side period compared signal from the low-side period comparing circuit LSDT.

The control circuit CTR, according to the high-side current limiting signal from the high-side current limit instructing circuit HSCL and the low-side current limiting signal from the low-side current limit instructing circuit LSCL, determines whether to control the high-side switch HS and the low-side switch LS according to the high-side detected signal HSOCP and the low-side detected signal LSOCP.

Figure 3:
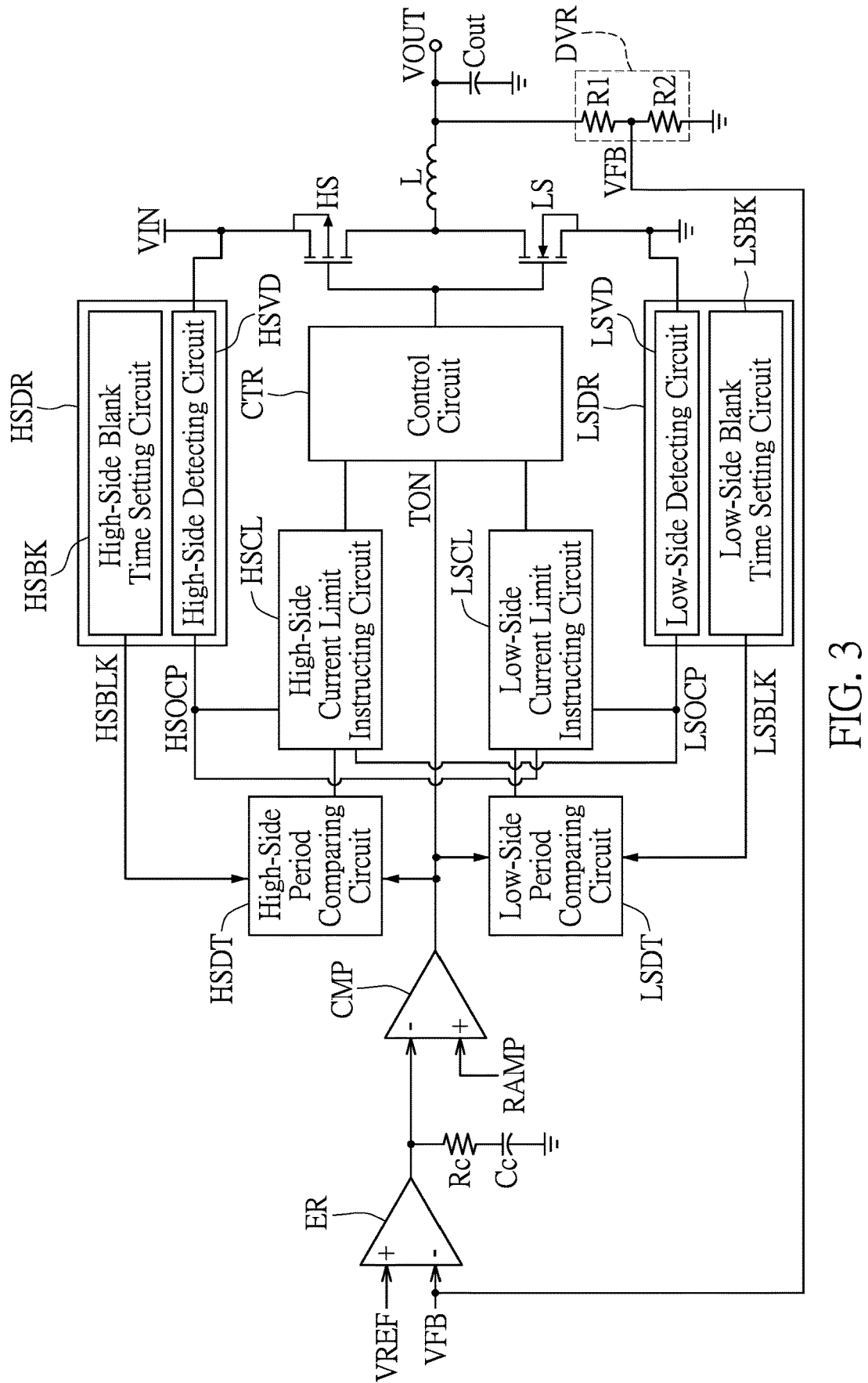
FIG. 3 is a circuit diagram of a power converter having a current limit protection mechanism according to a third embodiment of the present disclosure.

Reference is made to FIG. 3, which is a circuit diagram of a power converter having a current limit protection mechanism according to a third embodiment of the present disclosure. The descriptions of the third embodiment of the present disclosure the same as that of the second embodiment of the present disclosure are not repeated herein.

In the third embodiment, the current limit current of the power converter of the present disclosure, the high-side current limit detecting circuit HSDR includes a high-side blank time setting circuit HSBK and a high-side detecting circuit HSVD, and the low-side current limit detecting circuit LSDR includes a low-side blank time setting circuit LSBK and a low-side detecting circuit LSVD.

The high-side blank time setting circuit HSBK is connected to the high-side period comparing circuit HSDT. The high-side detecting circuit HSVD is connected to the first terminal of the high-side switch HS and the high-side current limit instructing circuit HSCL. The high-side detecting circuit HSVD may be further connected to the low-side current limit instructing circuit LSCL. The low-side blank time setting circuit LSBK is connected to the low-side period comparing circuit LSDT. The low-side detecting circuit LSVD is connected to the second terminal of the low-side switch LS and the low-side current limit instructing circuit LSCL. The low-side detecting circuit LSVD may be further connected to the high-side current limit instructing circuit HSCL.

The high-side detecting circuit HSVD detects the voltage, the current or other data of the first terminal of the high-side switch HS to output the high-side detected signal HSOCP to the high-side current limit instructing circuit HSCL.

The high-side blank time setting circuit HSBK sets and outputs the high-side blank time signal HSBLK to the high-side period comparing circuit HSDT.

The high-side period comparing circuit HSDT compares a working period of the on-time signal TON from the comparator CMP with a working period of the high-side blank time signal HSBLK from the high-side blank time setting circuit HSBK to output the high-side period compared signal.

The high-side current limit instructing circuit HSCL, according to the high-side period compared signal from the high-side period comparing circuit HSDT, determines whether to transmit the high-side detected signal HSOCP from the high-side detecting circuit HSVD to the control circuit CTR.

The low-side detecting circuit LSVD detects the voltage or the current or other data of the second terminal of the low-side switch LS to output the low-side detected signal LSOCP to the low-side current limit instructing circuit LSCL.

The low-side blank time setting circuit LSBK sets and outputs the low-side blank time signal LSBLK to the low-side period comparing circuit LSDT.

The low-side period comparing circuit LSDT compares the non-working period of the on-time signal TON from the comparator CMP with the non-working period of the low-side blank time signal LSBLK from the low-side blank time setting circuit LSBK to output the low-side period compared signal.

The low-side current limit instructing circuit LSCL, according to the low-side period compared signal from the low-side period comparing circuit LSDT, determines whether to transmit the low-side detected signal LSOCP from the low-side detecting circuit LSVD to the control circuit CTR.

The control circuit CTR controls and switches the high-side switch HS and the low-side switch LS according to the high-side detected signal HSOCP from the high-side current limit instructing circuit HSCL and the low-side detected signal LSOCP from the low-side current limit instructing circuit LSCL.

Figure 4:
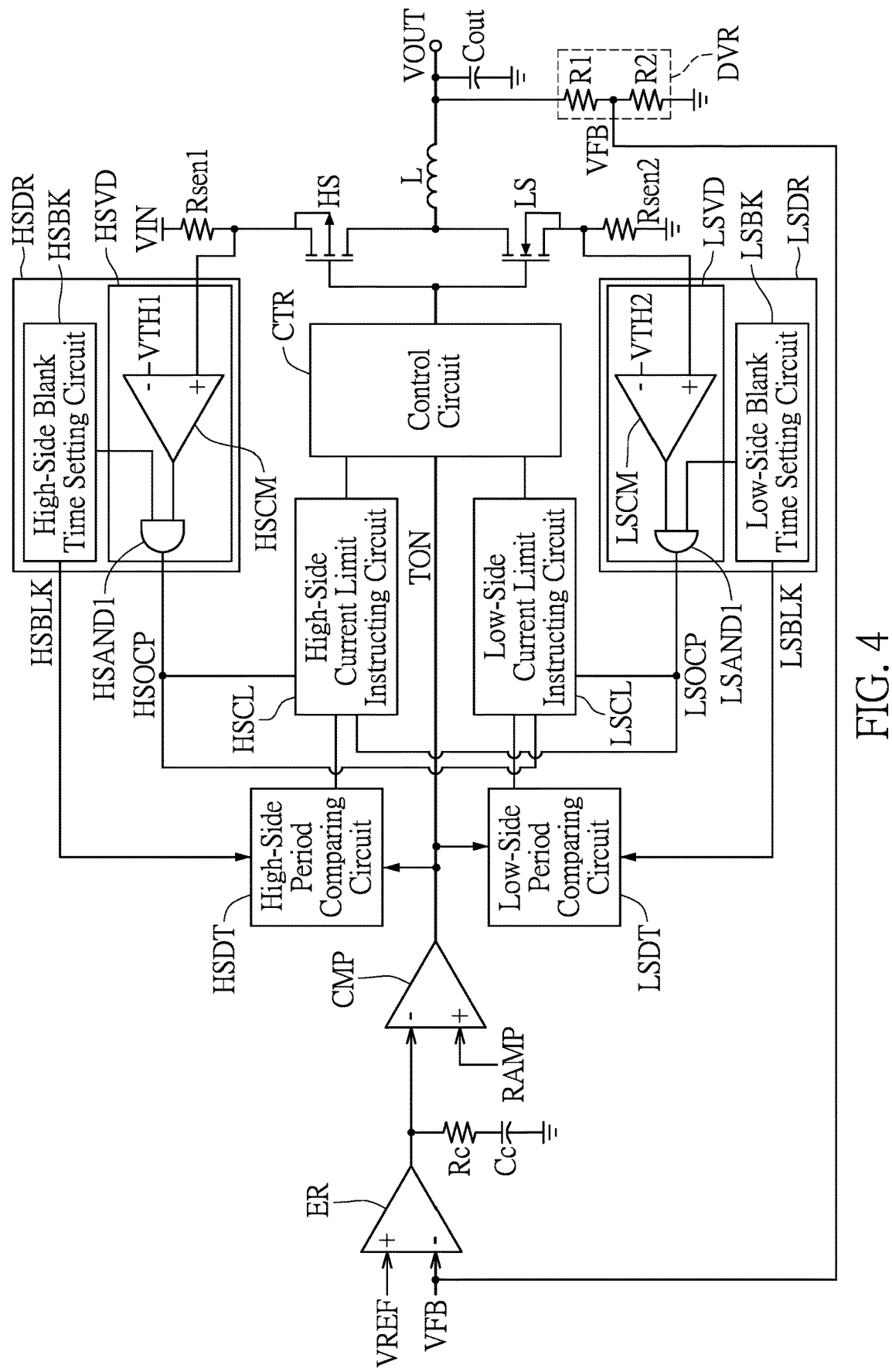
FIG. 4 is a circuit diagram of a power converter having a current limit protection mechanism according to a fourth embodiment of the present disclosure.

Reference is made to FIG. 4, which is a circuit diagram of a power converter having a current limit protection mechanism according to a fourth embodiment of the present disclosure. The descriptions of the fourth embodiment of the present disclosure that are the same as that of the first to third embodiment of the present disclosure are not repeated herein.

In the high-side current limit detecting circuit HSDR of the power converter of the fourth embodiment of the present disclosure, the high-side detecting circuit HSVD includes a high-side comparator HSCM and a first high-side AND gate HSAND1.

In the low-side current limit detecting circuit LSDR of the power converter of the fourth embodiment of the present disclosure, the low-side detecting circuit LSVD includes a low-side comparator LSCM and a first low-side AND gate LSAND1.

If necessary, the power converter of the present disclosure may further include two sensing resistors that are a high-side sensing resistor Rsen1 and a low-side sensing resistor Rsen2 as shown in FIG. 4.

The high-side comparator HSCM is a comparator. A first input terminal such as an inverting input terminal of the high-side comparator HSCM is coupled to a high-side threshold voltage VTH1. A second input terminal such as a non-inverting input terminal of the high-side comparator HSCM is connected to the first terminal of the high-side switch HS or a second terminal of the high-side sensing resistor Rsen1.

The first high-side AND gate HSAND1 is an AND gate. A first input terminal of the first high-side AND gate HSAND1 is connected to an output terminal of the high-side blank time setting circuit HSBK. A second input terminal of the first high-side AND gate HSAND1 is connected to an output terminal of the high-side comparator HSCM.

An output terminal of the first high-side AND gate HSAND1 is connected to an input terminal of the high-side current limit instructing circuit HSCL and an input terminal of the low-side current limit instructing circuit LSCL.

The low-side comparator LSCM is a comparator. A first input terminal such as an inverting input terminal of the low-side comparator LSCM is coupled to a low-side threshold voltage low-side VTH2. A second input terminal such as a non-inverting input terminal of the low-side comparator LSCM is connected to the second terminal of the low-side switch LS or the first terminal of the low-side sensing resistor Rsen2.

The first low-side AND gate LSAND1 is an AND gate. A first input terminal of the first low-side AND gate LSAND1 is connected to an output terminal of the low-side blank time setting circuit LSBK. A second input terminal of the first low-side AND gate LSAND1 is connected to an output terminal of the low-side comparator LSCM.

An output terminal of the first low-side AND gate LSAND1 is connected to the input terminal of the low-side current limit instructing circuit LSCL and the input terminal of the high-side current limit instructing circuit HSCL.

Figure 5:
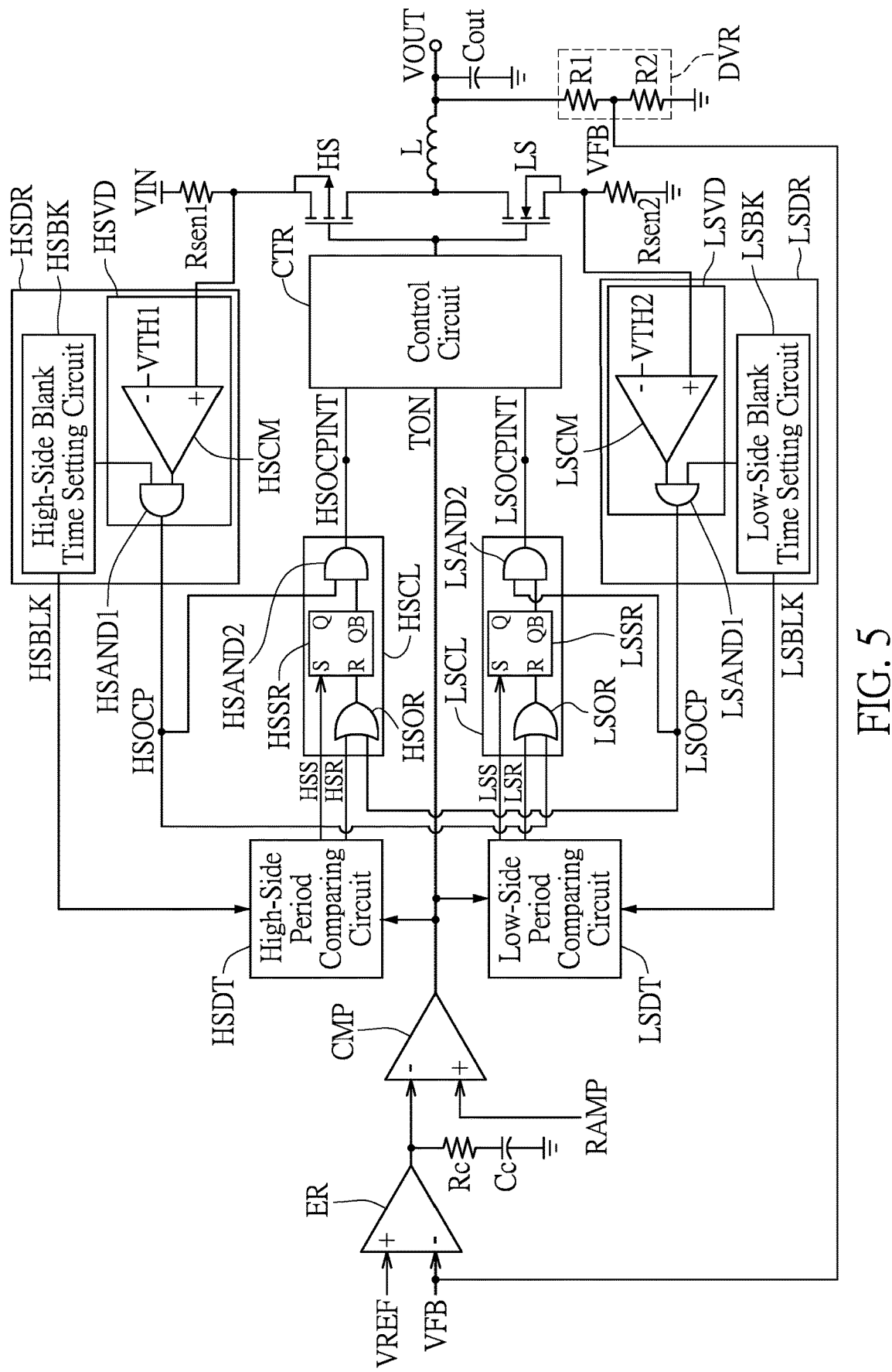
FIG. 5 is a circuit diagram of a power converter having a current limit protection mechanism according to a fifth embodiment of the present disclosure.
Figure 6:
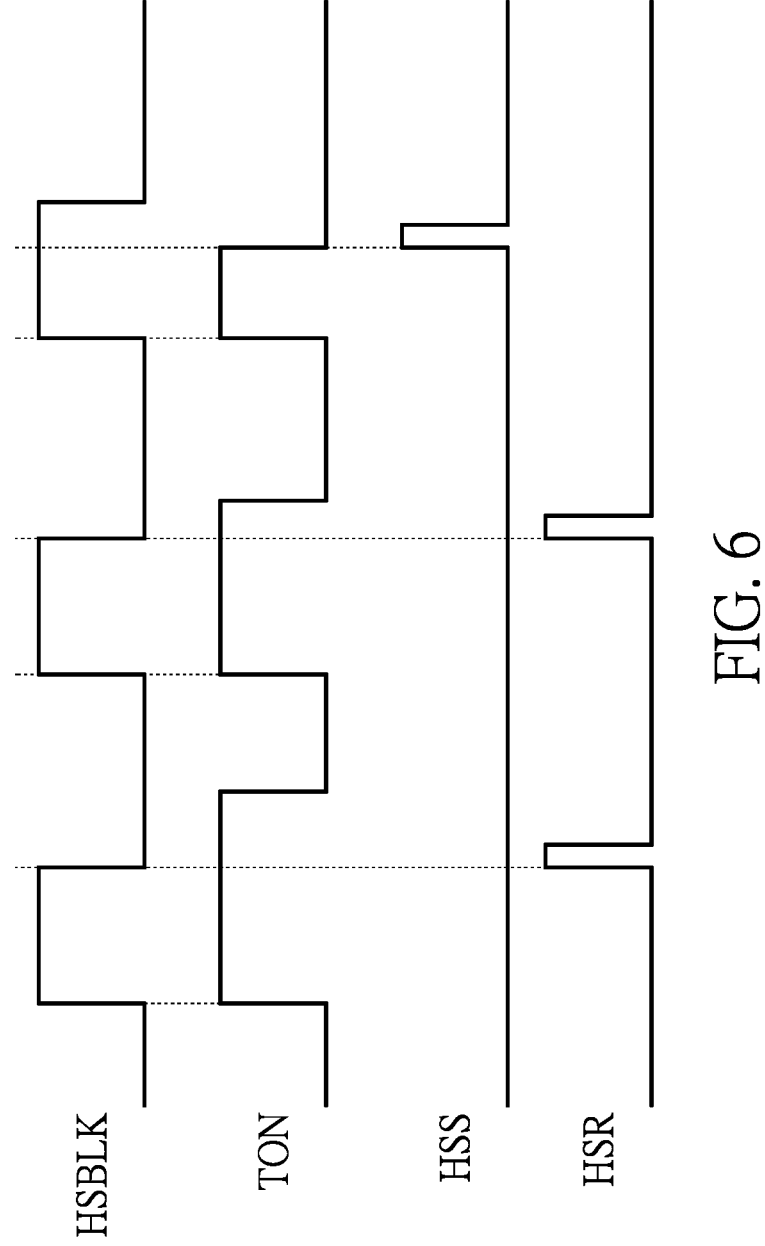
FIG. 6 is a waveform diagram of signals of the power converter having the current limit protection mechanism according to the fifth embodiment of the present disclosure.
Figure 7:
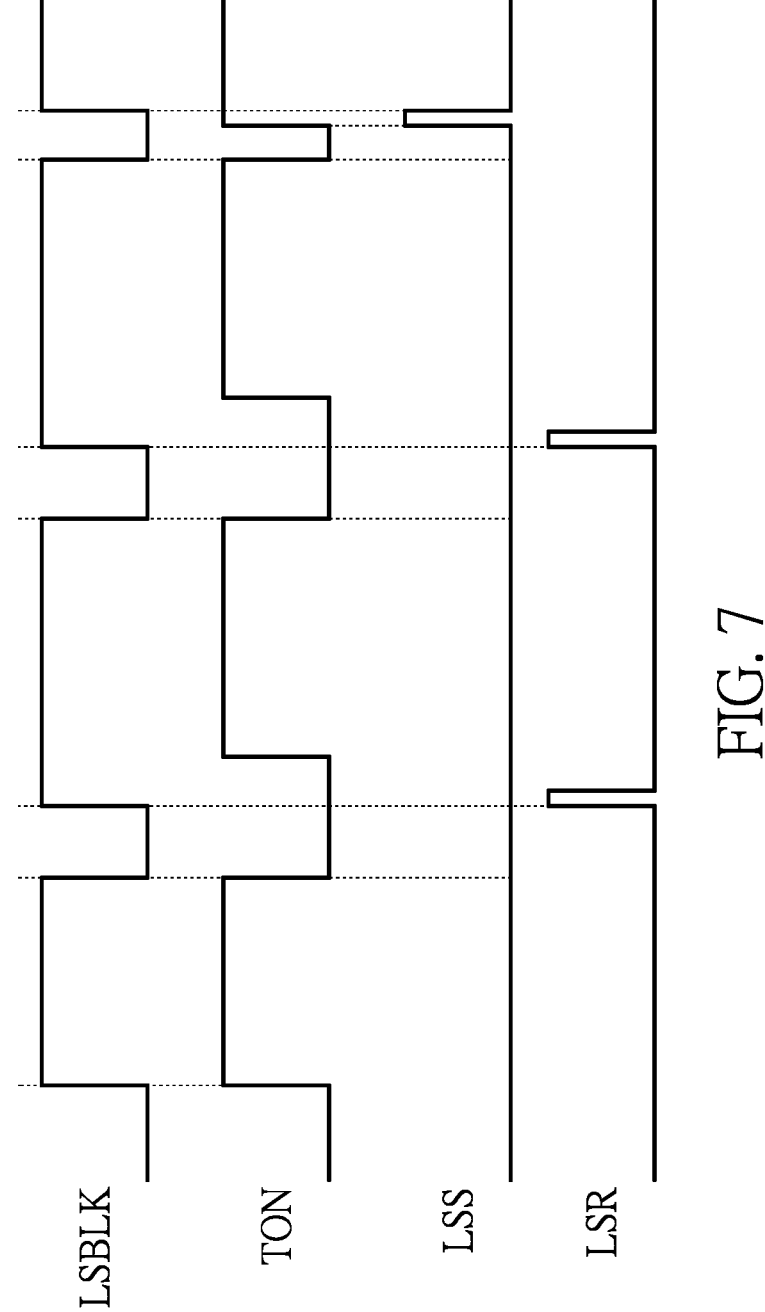
FIG. 7 is a waveform diagram of signals of the power converter having the current limit protection mechanism according to the fifth embodiment of the present disclosure.
Figure 8:
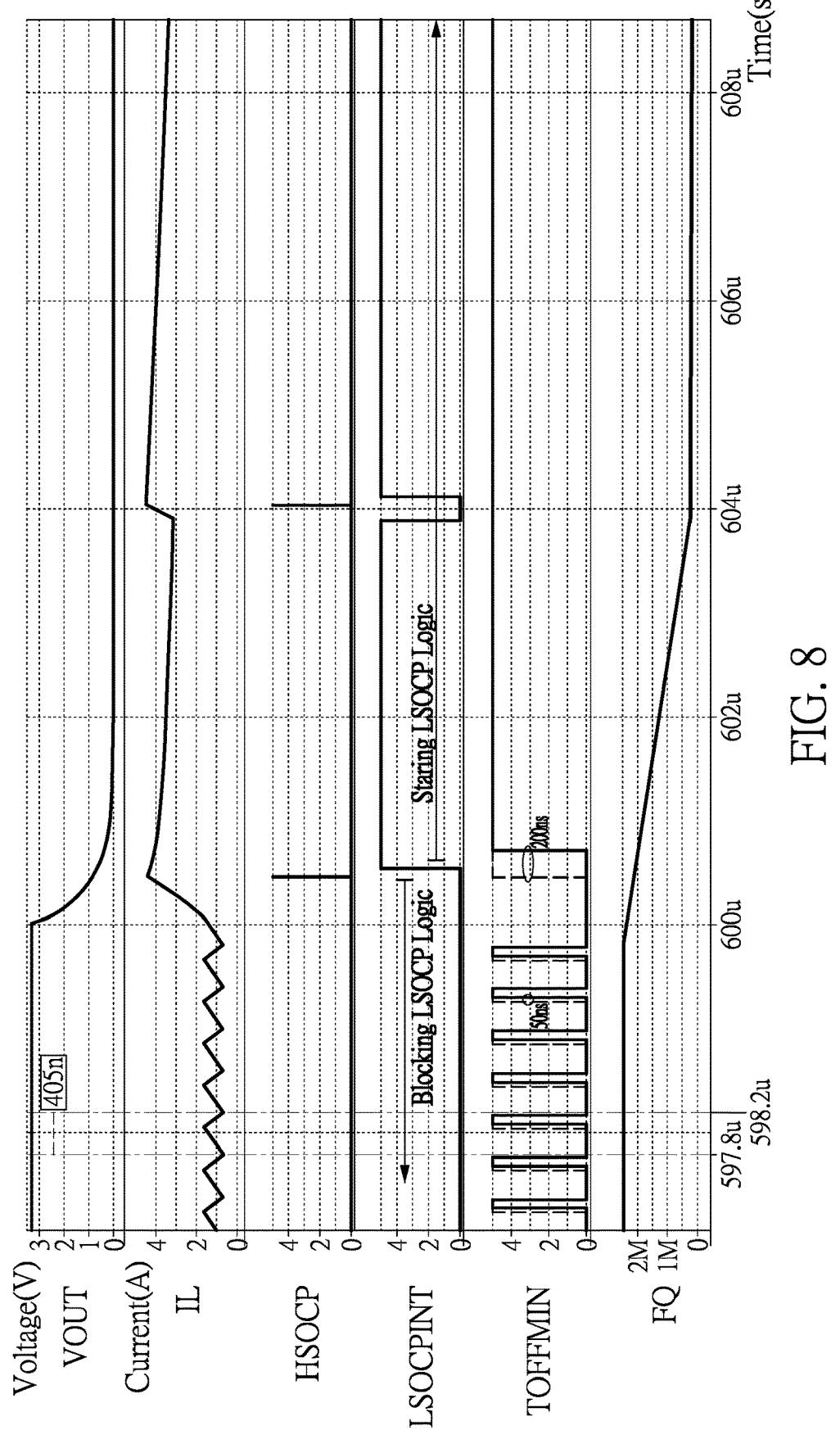
FIG. 8 is a waveform diagram of signals of the power converter having the current limit protection mechanism according to the fifth embodiment of the present disclosure.
Figure 9:
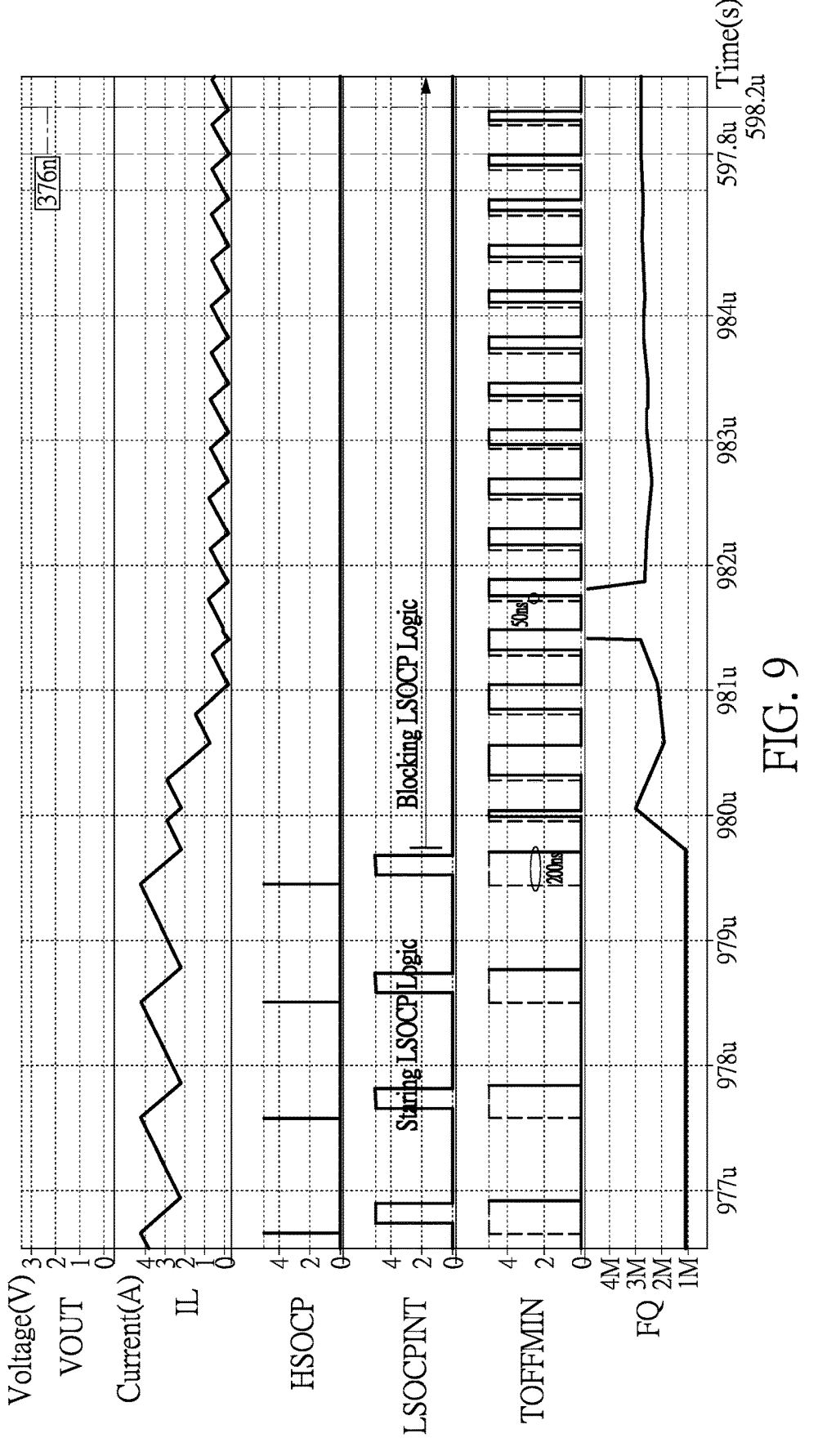
FIG. 9 is a waveform diagram of signals of the power converter having the current limit protection mechanism according to the fifth embodiment of the present disclosure.

Reference is made to FIG. 5 to FIG. 9, in which FIG. 5 is a circuit diagram of a power converter having a current limit protection mechanism according to a fifth embodiment of the present disclosure, and FIG. 6 and FIG. 9 are waveform diagrams of signals of the power converter having the current limit protection mechanism according to the fifth embodiment of the present disclosure. The descriptions of the fifth embodiment of the present disclosure that are the same as that of the first to fourth embodiment of the present disclosure are not repeated herein.

In the power converter of the fifth embodiment of the present disclosure, the high-side current limit instructing circuit HSCL includes a high-side OR gate HSOR, a high-side flip-flop HSSR and a second high-side AND gate HSAND2.

The high-side OR gate HSOR is an OR gate. A first input terminal of the high-side OR gate HSOR is connected to an output terminal of the high-side period comparing circuit HSDT. The first input terminal of the high-side OR gate HSOR receives a high-side period reverse compared signal HSR from the output terminal of the high-side period comparing circuit HSDT. A second input terminal of the high-side OR gate HSOR is connected to the output terminal of the first low-side AND gate LSAND1.

The high-side flip-flop HSSR is a flip-flop such as, but not limited to a SR flip-flop. A first input terminal S of the high-side flip-flop HSSR is connected to the output terminal of the high-side period comparing circuit HSDT. The first input terminal S of the high-side flip-flop HSSR receives a high-side period compared signal HSS from the output terminal of the high-side period comparing circuit HSDT. A second input terminal R of the high-side flip-flop HSSR is connected to an output terminal of the high-side OR gate HSOR.

A logic level of the high-side period compared signal HSS is opposite to a logic level of the high-side period reverse compared signal HSR, but the present disclosure is not limited thereto.

The second high-side AND gate HSAND2 is an AND gate. A first input terminal of the second high-side AND gate HSAND2 is connected to the output terminal of the first high-side AND gate HSAND1. A second input terminal of the second high-side AND gate HSAND2 is connected to an inverting output terminal QB of the high-side flip-flop HSSR. An output terminal of the second high-side AND gate HSAND2 is connected to an output terminal of the control circuit CTR. The output terminal of the second high-side AND gate HSAND2 outputs a high-side feedback signal HSOCPINT to the input terminal of the control circuit CTR.

In the power converter of the fifth embodiment of the present disclosure, the low-side current limit instructing circuit LSCL includes a low-side OR gate LSOR, a low-side flip-flop LSSR and a second low-side AND gate LSAND2.

The low-side OR gate LSOR is an OR gate. A first input terminal of the low-side OR gate LSOR is connected to an output terminal of the low-side period comparing circuit LSDT. The first input terminal of the low-side OR gate LSOR receives a low-side period reverse compared signal LSR from the output terminal of the low-side period comparing circuit LSDT. A second input terminal of the low-side OR gate LSOR is connected to the output terminal of the first high-side AND gate HSAND1.

The low-side flip-flop LSSR is a flip-flop. A first input terminal S of the low-side flip-flop LSSR is connected to the output terminal of the low-side period comparing circuit LSDT. The first input terminal S of the low-side flip-flop LSSR receives a low-side period compared signal LSS from the output terminal of the low-side period comparing circuit LSDT. A second input terminal R of the low-side flip-flop LSSR is connected to an output terminal of the low-side OR gate LSOR.

A logic level of the low-side period reverse compared signal LSR is opposite to a logic level of the low-side period compared signal LSS, but the present disclosure is not limited thereto.

The second low-side AND gate LSAND2 is an AND gate. A first input terminal of the second low-side AND gate LSAND2 is connected to the output terminal of the first low-side AND gate LSAND1. A second input terminal of the second low-side AND gate LSAND2 is connected to the inverting output terminal QB of the low-side flip-flop LSSR. An output terminal of the second low-side AND gate LSAND2 is connected to the input terminal of the control circuit CTR. The output terminal of the second low-side AND gate LSAND2 outputs a low-side feedback signal LSOCPINT to the input terminal of the control circuit CTR.

The comparator CMP compares the voltage of the error amplified signal (or the voltage of the first terminal of the input resistor Rc) with the ramp signal RAMP from the external ramp signal generator circuit to output the on-time signal.

The control circuit CTR controls the high-side switch HS according to the on-time signal TON from the comparator CMP. The control circuit CTR turns on the high-side switch HS within the working period of the on-time signal TON, and turns off the high-side switch HS within the non-working period of the on-time signal TON. The control circuit CTR turns off the low-side switch LS within the working period of the on-time signal TON, and turns on the low-side switch LS within the non-working period of the on-time signal TON. That is, the control circuit CTR alternately turns on the high-side switch HS and the low-side switch LS.

As shown in FIG. 6, a working period of a third one of a plurality of waveforms of the on-time signal TON outputted by the comparator CMP is smaller than the working period of the high-side blank time signal HSBLK.

As shown in FIG. 6, when the high-side period comparing circuit HSDT determines that the working period of the on-time signal TON from the comparator CMP is smaller than the working period of the high-side blank time signal HSBLK from the high-side current limit detecting circuit HSDR, the high-side period comparing circuit HSDT outputs the high-side period compared signal HSS having a high logic value "1" to the first input terminal S of the high-side flip-flop HSSR and outputs the high-side period reverse compared signal HSR having a high logic value "0" to the second input terminal R of the high-side flip-flop HSSR. As a result, the second input terminal of the second high-side AND gate HSAND2 receives a low logic value "0" from the inverting output terminal QB of the high-side flip-flop HSSR. At this time, regardless of a logic value outputted by the first high-side AND gate HSAND1, the control circuit CTR receives the low logic value "0" from the output terminal of the second high-side AND gate HSAND2.

That is, when the working period of the on-time signal TON outputted by the comparator CMP is smaller than the working period of the high-side blank time signal HSBLK, the control circuit CTR does not control and switch the high-side switch HS according to the voltage of the first terminal of the high-side switch HS or the second terminal of the high-side sensing resistor Rsen1 that is detected by the high-side current limit detecting circuit HSDR.

After the high-side switch HS is switched, a fluctuation occurs in a (voltage) signal of the first terminal of the high-side switch HS or the second terminal of the high-side sensing resistor Rsen1 within the working period of the high-side blank time signal HSBLK due to the turning on of the high-side switch HS. As a result, the (voltage) signal of the first terminal of the high-side switch HS or the second terminal of the high-side sensing resistor Rsen1 is not correctly detected within the working period of the high-side blank time signal HSBLK, and thus cannot be used to control and switch the high-side switch HS.

The high-side switch HS is turned on within the working period of the on-time signal TON. The smaller the working period of the on-time signal TON is, the shorter the on-time of the high-side switch HS is. When the working period of the on-time signal TON (within which the high-side switch HS is turned on) is smaller than the working period of the high-side blank time signal HSBLK that is later than the high-side switch HS being turned on, the (voltage) signal of the first terminal of the high-side switch HS is not correctly detected within the working period of the on-time signal TON and thus cannot be used to control and switch the high-side switch HS.

Furthermore, the smaller the working period of the on-time signal TON is and the shorter the on-time of the high-side switch HS is, the smaller the output current of the power converter is. When the working period of the on-time signal TON within which the high-side switch HS is turned on has a small time length, the high-side switch HS and other circuit components of the power converter are not damaged due to overcurrent. At this time, the current limit circuit does not need to perform a current limit operation in which the high-side switch HS is controlled according to the data such as the voltage of the first terminal of the high-side switch HS or the second terminal of the high-side sensing resistor Rsen1.

Conversely, when the working period of the on-time signal TON outputted by the comparator CMP is larger than the working period of the high-side blank time signal HSBLK, the control circuit CTR controls and switches the high-side switch HS according to the voltage of the first terminal of the high-side switch HS or the second terminal of the high-side sensing resistor Rsen1 that is detected by the high-side current limit detecting circuit HSDR.

On the other hand, when the low-side period comparing circuit LSDT determines that the non-working period of the on-time signal TON from the comparator CMP is smaller than the non-working period of the low-side blank time signal LSBLK from the low-side current limit detecting circuit LSDR, the low-side period comparing circuit LSDT outputs the low-side period compared signal LSS having a logic value "1" to the first terminal S of the low-side flip-flop LSSR and outputs the low-side period reverse compared signal LSR having a logic value "0" to the second terminal R of the low-side flip-flop LSSR. As a result, the second input terminal of the second low-side AND gate LSAND2 receives the logic value "0" from the inverting output terminal QB of the low-side flip-flop LSSR. At this time, regardless of the logic value outputted by the first low-side AND gate LSAND1, the control circuit CTR receives the low logic value "0" from the output terminal of the second low-side AND gate LSAND2.

As shown in FIG. 7, when the non-working period of the on-time signal TON outputted by the comparator CMP is smaller than the non-working period of the low-side blank time signal LSBLK, the low-side period comparing circuit LSDT outputs the low-side period compared signal LSS at a high logic level. As a result, the second low-side AND gate LSAND2 outputs the low-side feedback signal LSOCPINT at a low logic level to the control circuit CTR. As a result, the low-side feedback signal LSOCPINT is equivalently blocked by the second low-side AND gate LSAND2. The control circuit CTR does not control and switch the low-side switch LS according to the low-side feedback signal LSOCPINT at the low logic level. That is, the control circuit CTR does not control and switch the low-side switch LS according to a voltage of the second terminal of the low-side switch LS or the first terminal of the low-side sensing resistor Rsen2 that is detected by the low-side current limit detecting circuit LSDR at this time.

As shown in FIG. 8, when a current IL of the inductor L increases such that the high-side current limit detecting circuit HSDR outputs the high-side detected signal HSOCP at a high logic level, the second high-side AND gate HSAND2 outputs the low-side feedback signal LSOCPINT at a high logic level. The control circuit CTR controls and switches the low-side switch LS according to the low-side feedback signal LSOCPINT at the high logic level. That is, the control circuit CTR controls and switches the low-side switch LS according to the voltage of the second terminal of the low-side switch LS or the first terminal of the low-side sensing resistor Rsen2 that is detected by the low-side current limit detecting circuit LSDR at this time.

Conversely, as shown in FIG. 9, when the high-side current limit detecting circuit HSDR outputs the high-side detected signal HSOCP at the high logic level, the second high-side AND gate HSAND2 outputs the low-side feed-back signal LSOCPINT at the high logic level. The control circuit CTR controls and switches the low-side switch LS according to the low-side feedback signal LSOCPINT at the low-side feedback signal LSOCPINT. Then, when the cur-rent IL of the inductor L is not decreased and the high-side detected signal HSOCP is at a low logic level, and the non-working period of the on-time signal TON outputted by the comparator CMP is smaller than the non-working period of the low-side blank time signal LSBLK, the low-side period comparing circuit LSDT outputs the low-side period compared signal LSS at the high logic level. Therefore, the second low-side AND gate LSAND2 outputs the low-side feedback signal LSOCPINT at the low logic level to the control circuit CTR. As a result, the low-side feedback signal LSOCPINT is equivalently blocked by the second low-side AND gate LSAND2. The control circuit CTR does not control and switch the low-side switch LS according to the low-side feedback signal LSOCPINT at the low logic level.

A working period of a minimum off time signal TOFFMIN as shown in FIG. 8 and FIG. 9 is a minimum off time of the high-side switch HS, and a frequency of a switching frequency signal FQ as shown in FIG. 8 and FIG. 9 is a switching frequency of the high-side switch HS and the low-side switch LS.

After the high-side switch HS is switched, a fluctuation occurs in a (voltage) signal of the second terminal of the low-side switch LS within the non-working period of the high-side blank time signal HSBLK due to the turning on of the low-side switch LS. As a result, the (voltage) signal of the second terminal of the low-side switch LS or the first terminal of the low-side sensing resistor Rsen2 is not correctly detected within the non-working period of the low-side blank time signal LSBLK and thus cannot be used to control and switch the low-side switch LS.

The low-side switch LS is turned on within the non-working period of the on-time signal TON. The smaller the non-working period of the on-time signal TON is, the shorter the on-time of the low-side switch LS is. When the non-working period of the on-time signal TON (within which the low-side switch LS is turned on) is smaller than the non-working period of the low-side blank time signal LSBLK is later than the low-side switch LS is turned on, the (voltage) signal of the second terminal of the low-side switch LS or the first terminal of the low-side sensing resistor Rsen2 is not correctly detected within the time during which the low-side switch LS is turned on and thus cannot be used to control and switch the low-side switch LS.

Conversely, when the non-working period of the on-time signal TON outputted by the comparator CMP is larger than the non-working period of the low-side blank time signal LSBLK, the control circuit CTR controls and switches the low-side switch LS according to the voltage of the second terminal of the low-side switch LS or the first terminal of the low-side sensing resistor Rsen2 that is detected by the low-side current limit detecting circuit LSDR.

Furthermore, the smaller the non-working period of the on-time signal TON is and the shorter the on-time of the low-side switch LS is, the smaller the current sequentially flowing though the inductor L and the low-side switch LS to a ground is. When the current flowing though the low-side switch LS is a small current, the low-side switch LS and other circuit components of the power converter are dam-aged due to overcurrent. At this time, the current limit circuit does not need to perform the current limit operation in which the low-side switch LS is controlled according to the data such as the voltage of the second terminal of the low-side switch LS or the first terminal of the low-side sensing resistor Rsen2.

In conclusion, the present disclosure provides the power converter having the current limit protection mechanism. After the high-side switch and the low-side switch are switched in the power converter of the present disclosure, the data including the voltage signal and the current signal of the power converter is detected. At this time, the current limit circuit of the power converter determines whether the data of the power converter is detected when the data fluctuates unexpectedly, and accordingly determines whether the data is used to control the high-side switch and the low-side switch. The high-side switch and the low-side switch of the power converter of the present disclosure are switched only according to the corrected data. As a result, when a load connected to the power converter of the present disclosure is a heavy load, the high-side switch and the low-side switch of the power converter of the present disclosure is capable of being accurately switched at a high frequency. Therefore, an overall operating efficiency of the power converter of the present disclosure is effectively improved. The load obtains enough power from the power converter of the present disclosure under the condition that overcurrent and overvoltage events do not occur in the power converter of the present disclosure.

The foregoing description of the exemplary embodiments of the disclosure has been presented only for the purposes of illustration and description and is not intended to be exhaus-tive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contem-plated. Alternative embodiments will become apparent to those skilled in the art to which the present disclosure pertains without departing from its spirit and scope.

What is claimed is:

1. A power converter having a current limit protection mechanism, comprising:

a high-side switch, wherein a first terminal of the high-side switch is coupled to an input voltage;

a low-side switch, wherein a first terminal of the low-side switch is connected to a second terminal of the high-side switch, a second terminal of the low-side switch is grounded, the first terminal of the low-side switch is connected to a first terminal of an inductor, a second terminal of the inductor is connected to a first terminal of an output capacitor, a second terminal of the output capacitor is grounded, and the first terminal of the output capacitor is used as a feedback node;

an error amplifier, wherein a first input terminal of the error amplifier is coupled to a reference voltage, and a second input terminal of the error amplifier is connected to the feedback node;

a comparator, wherein a first input terminal of the comparator is connected to an output terminal of the error amplifier, and a second input terminal of the comparator is connected to an external ramp signal generator circuit and receives a ramp signal from the external ramp signal generator circuit;

a current limiting circuit connected to the first terminal of the high-side switch, the second terminal of the low-side switch and an output terminal of the comparator; and a control circuit connected to the current limiting circuit, a control terminal of the high-side switch and a control terminal of the low-side switch;

wherein the current limiting circuit detects data of the first terminal of the high-side switch to output a high-side detected signal, and compares an on-time signal with a high-side blank time signal to output a high-side current limiting signal;

wherein the control circuit, according to the high-side current limiting signal, determines whether to control the high-side switch and the low-side switch according to the high-side detected signal;

wherein the current limiting circuit detects data of the second terminal of the low-side switch to output a low-side detected signal, and compares the on-time signal with a low-side blank time signal to output a low-side current limiting signal;

wherein the control circuit, according to the low-side current limiting signal, determines whether to control the high-side switch and the low-side switch according to the low-side detected signal;

wherein the current limiting circuit includes:

a high-side current limit detecting circuit connected to the first terminal of the high-side switch, and configured to detect the data of the first terminal of the high-side switch to output the high-side detected signal;

a high-side period comparing circuit connected to the high-side current limit detecting circuit and the output terminal of the comparator, and configured to compare the on-time signal from the comparator with the high-side blank time signal from the high-side current limit detecting circuit to output a high-side period compared signal;

a high-side current limit instructing circuit connected to the high-side period comparing circuit and the control circuit, and configured to output the high-side current limiting signal to the control circuit according to the high-side period compared signal from the high-side period comparing circuit;

a low-side current limit detecting circuit connected to the second terminal of the low-side switch, and configured to detect the data of the second terminal of the low-side switch to output the low-side detected signal;

a low-side period comparing circuit connected to the low-side current limit detecting circuit and the output terminal of the comparator, and configured to compare a non-working period of the on-time signal from the comparator with a non-working period of the low-side blank time signal from the low-side current limit detecting circuit to output a low-side period compared signal; and a low-side current limit instructing circuit connected to the low-side period comparing circuit and the control circuit, and configured to output the low-side current limiting signal to the control circuit according to the low-side period compared signal from the low-side period comparing circuit;

wherein the high-side current limit detecting circuit includes:

a high-side blank time setting circuit connected to the high-side period comparing circuit, and configured to set and output the high-side blank time signal to the high-side period comparing circuit; and a high-side detecting circuit connected to the first terminal of the high-side switch and the high-side current limit instructing circuit, and configured to detect the data of the first terminal of the high-side switch to output the high-side detected signal to the high-side current limit instructing circuit;

wherein the high-side current limit instructing circuit, according to the high-side period compared signal, determines whether to transmit the high-side detected signal from the high-side detecting circuit to the control circuit.

2. The power converter according to claim 1, wherein the control circuit turns on the high-side switch within a working period of the on-time signal, and the current limiting circuit compares the working period of the on-time signal from the comparator with a working period of the high-side blank time signal to output the high-side current limiting signal.

3. The power converter according to claim 1, wherein the control circuit turns on the low-side switch within a non-working period of the on-time signal, and the current limiting circuit compares the non-working period of the on-time signal from the comparator with a non-working period of the low-side blank time signal to output the low-side current limiting signal.

4. The power converter according to claim 1, wherein the control circuit turns on the high-side switch within a working period of the on-time signal;

wherein, when the current limiting circuit determines that the working period of the on-time signal is smaller than a working period of the high-side blank time signal, the current limiting circuit determines that the data of the first terminal of the high-side switch that is detected within the working period of the on-time signal is not used to control and switch the high-side switch and the low-side switch.

5. The power converter according to claim 1, wherein the control circuit turns on the low-side switch within a non-working period of the on-time signal;

wherein, when the current limiting circuit determines that the non-working period of the on-time signal from the comparator is smaller than a non-working period of the low-side blank time signal, the current limiting circuit determines that the data of the second terminal of the low-side switch that is detected within the non-working period of the on-time signal is not used to control and switch the high-side switch and the low-side switch.

6. The power converter according to claim 1, wherein the low-side current limit detecting circuit includes:

a low-side blank time setting circuit connected to the low-side period comparing circuit, and configured to set and output the low-side blank time signal to the low-side period comparing circuit; and a low-side detecting circuit connected to the second terminal of the low-side switch and the low-side current limit instructing circuit, and configured to detect the data of the second terminal of the low-side switch to output the low-side detected signal to the low-side current limit instructing circuit;

wherein the low-side current limit instructing circuit determines whether to transmit the low-side detected signal from the low-side detecting circuit to the control circuit according to the low-side detected period compared signal.

7. The power converter according to claim 6, wherein the low high-side detecting circuit includes:

a high-side comparator, wherein the high-side comparator is a comparator, a first input terminal of the high-side comparator is coupled to a high-side threshold voltage, and a second input terminal of the high-side comparator is connected to the first terminal of the high-side switch; and a first high-side AND gate, wherein the first high-side AND gate is an AND gate, and wherein a first input terminal of the first high-side AND gate is connected to an output terminal of the high-side blank time setting circuit, a second input terminal of the first high-side AND gate is connected to an output terminal of the high-side comparator, and an output terminal of the first high-side AND gate is connected to an input terminal of the high-side current limit instructing circuit and an input terminal of the low-side current limit instructing circuit.

8. The power converter according to claim 7, wherein the low-side detecting circuit includes:

a low-side comparator, wherein the low-side comparator is a comparator, a first input terminal of the low-side comparator is coupled to a low-side threshold voltage, and a second input terminal of the low-side comparator is connected to the second terminal of the low-side switch; and a first low-side AND gate, wherein the first low-side AND gate is an AND gate, and wherein a first input terminal of the first low-side AND gate is connected to an output terminal of the low-side blank time setting circuit, a second input terminal of the first low-side AND gate is connected to an output terminal of the low-side comparator, and an output terminal of the first low-side AND gate is connected to the input terminal of the low-side current limit instructing circuit and the input terminal of the high-side current limit instructing circuit.

9. The power converter according to claim 8, wherein the high-side current limit instructing circuit includes:

a high-side OR gate, wherein the high-side OR gate is an OR gate, a first input terminal of the high-side OR gate is connected to an output terminal of the high-side period comparing circuit and receives a high-side period reverse compared signal from the output terminal of the high-side period comparing circuit, and a second input terminal of the high-side OR gate is connected to the output terminal of the first low-side AND gate;

a high-side flip-flop, wherein the high-side flip-flop is a flip-flop, a first input terminal of the high-side flip-flop is connected to the output terminal of the high-side period comparing circuit and receives the high-side period compared signal from the output terminal of the high-side period comparing circuit, and a second input terminal of the high-side flip-flop is connected to an output terminal of the high-side OR gate; and a second high-side AND gate, wherein the second high-side AND gate is an AND gate, a first input terminal of the second high-side AND gate is connected to the output terminal of the first high-side AND gate, a second input terminal of the second high-side AND gate is connected to an inverting output terminal of the high-side flip-flop, and an output terminal of the second high-side AND gate is connected to an input terminal of the control circuit.

10. The power converter according to claim 9, wherein the low-side current limit instructing circuit includes:

a low-side OR gate, wherein the low-side OR gate is an OR gate, a first input terminal of the low-side OR gate is connected to an output terminal of the low-side period comparing circuit and receives a low-side period reverse compared signal from the output terminal of the low-side period comparing circuit, and a second input terminal of the low-side OR gate is connected to the output terminal of the first high-side AND gate;

a low-side flip-flop, wherein the low-side flip-flop is a flip-flop, a first input terminal of the low-side flip-flop is connected to the output terminal of the low-side period comparing circuit and receives the low-side period compared signal from the output terminal of the low-side period comparing circuit, and a second input terminal of the low-side flip-flop is connected to an output terminal of the low-side OR gate; and a second low-side AND gate, wherein the second low-side AND gate is an AND gate, a first input terminal of the second low-side AND gate is connected to the output terminal of the first low-side AND gate, a second input terminal of the second low-side AND gate is connected to an inverting output terminal of the low-side flip-flop, and an output terminal of the second low-side AND gate is connected to the input terminal of the control circuit.

11. The power converter according to claim 1, further comprising:

an input resistor, wherein a first terminal of the input resistor is connected to the output terminal of the error amplifier and the first input terminal of the comparator; and an input capacitor, wherein a first terminal of the input capacitor is connected to a second terminal of the input resistor, and a second terminal of the input capacitor is grounded.

12. The power converter according to claim 1, further comprising:

a voltage divider circuit, wherein an input terminal of the voltage divider circuit is connected to a node between the second terminal of the inductor and the first terminal of the output capacitor, and an output terminal of the voltage divider circuit is connected to the second input terminal of the error amplifier.

13. The power converter according to claim 12, wherein the voltage divider circuit includes:

a first resistor, wherein a first terminal of the first resistor is connected to the node between the second terminal of the inductor and the first terminal of the output capacitor; and a second resistor, wherein a first terminal of the second resistor is connected to a second terminal of the first resistor, a second terminal of the second resistor is grounded, and a node between the first terminal of the second resistor and the second terminal of the first resistor is connected to the second input terminal of the error amplifier.

* * * * *